Nov. 17, 1970  R. W. SIMISTER  3,541,398

ELECTRICAL SWITCHING SYSTEM AND METHOD

Filed March 20, 1967  2 Sheets-Sheet 1

INVENTOR.
RALPH WAYNE SIMISTER
BY
*Lynn L. Foster*
ATTORNEY

Nov. 17, 1970 R. W. SIMISTER 3,541,398
ELECTRICAL SWITCHING SYSTEM AND METHOD
Filed March 20, 1967 2 Sheets-Sheet 2

INVENTOR.
RALPH WAYNE SIMISTER
BY
*Lynn H. Foster*
ATTORNEY

United States Patent Office 3,541,398
Patented Nov. 17, 1970

3,541,398
ELECTRICAL SWITCHING SYSTEM AND METHOD
Ralph Wayne Simister, Salt Lake City, Utah, assignor to University of Utah
Filed Mar. 20, 1967, Ser. No. 624,566
Int. Cl. H01h 47/12
U.S. Cl. 317—146        1 Claim

ABSTRACT OF THE DISCLOSURE

An electrical switching system and method providing a spark-free activating switch without moving parts that is located at the leading end of a shielded cable of extended length; sensitivity in the switch being preserved by transmitting electrical energy along the cable shield. A method of determining the operational state of an electrically operated device in which a circuit controlling element is compelled to assume a known operational state in the event power is unexpectedly denied and then restored to the system.

---

This invention relates to an electrical switching system and method and more particularly to a novel touch plate system utilizing touch plates to activate and suspend electric energy to electrically operated apparatus.

Commonly, electric current is controlled with a mechanical switch such as a toggle switch, push button, or other mechanical device which engages or disengages contact points to complete a circuit between a source of electricity and an electric apparatus resulting in continuation or suspension of the operation of said electrical apparatus.

The exchanging of the contact points frequently results in sparks which historically have been a major concern in hospitals and industry where the presence of explosive or inflammable gases or material may present a dangerous hazard. Therefore, expensive, space-consuming, spark-proof housing must be installed to prevent exposure of the spark to the atmosphere. Furthermore, in common electrical switching mechanisms, one electrical housing must be located directly behind the switch to contain the mechanical switching elements and another must be located in close proximity to the electrical apparatus to provide for electrical connections into the electrical apparatus. This may result in a switch being placed in a less desirable location in a home or building or the changing of architecture to provide a space large enough to contain switch housings. Moreover, additional expenditures of time and material are required to purchase and install electrical switch housing.

If an effort to substitute non-mechanical switches for the common mechanical systems, switches without moving parts were developed which are activated by the property of capacitance to ground which is inherent in all human beings. The phrase "capacitance to ground" as used herein, means the natural phenomenon occurring when a human being effectively becomes an electrical capacitor by contacting a conducting line that is connected into an electric circuit. Prior touch responsive systems have generally required that control circuitry be maintained in close proximity to the sensing switch because cable that connects the sensing switch has a capacitance which increases proportional to the cable length. The increase in capacitance in the cable is inversely proportional to the sensitivity of the sensing switch. Thus, the sensing switch and control circuitry frequently occupy more space than the mechanical switches.

It is, therefore, a primary object of the present invention to provide a novel touch plate switching system and method in which the touch plate may be located a considerable distance from the control circuitry without loss of sensitivity, thus eliminating any need for electrical housings in the mounting surface.

A further disadvantage of prior touch response systems as described in the prior art is encountered when power failures result in a discontinuation of electric current. When the power is resumed at some undetermined future time, lights, machinery, or other electrically controlled equipment may resume operation unattended. Conventional touch systems make no provision for automatic discontinuation of current after a power failure.

One embodiment of the present invention comprises a touch plate composed of any suitable electrically conductive substance in essentially any desired shape or form and is connected by a low-current, radially-shielded cable to a small, compact control element which contains an amplifier, pulse generator, relay and the necessary circuitry. This element may be fixed at any convenient location near to or remote from the touch plate, and connected directly or through suitable conductive material to essentially any electrical device. In the presently preferred embodiment of this invention, the control cable connecting the touch plate with the control element is the only essential wiring in the close proximity of the touch plate thereby obviating the need for bulky electrical housings. Furthermore, because said control cable is of relatively low current and there are no movable connections in the touch plate, the switch is virtually sparkless and completely safe in substantially all areas where special electric switch housings have previously been required.

The sensitivity of the touch plate at the end of a length of cable is preserved by sending an electrical signal that is in phase with the signal caused when the touch plate is grounded by a person and conducting said signal along the cable shield. This in-phase signal conducted along the shield is termed "in-phase feedback" and in general, it results from amplifying the signal generated by actuation of the touch plate and conducting the amplified signal to the cable shield. The operation of any electrical device connected to the control element of the presently preferred embodiment of this invention may then be commenced or suspended by touching the touch plate. A plurality of touch plates may be connected into the cable at various locations such that contact with any one of them will reverse the operational state of the electrical apparatus.

Therefore, it is another primary object of the present invention to provide a method of essentially eliminating the capacitance of connecting cable to accommodate location of the control ciruitry remote from the touch plate without decreased sensitivity of the touch plate.

Another important object of this invention is to provide a failsafe wherein it may be predetermined whether resumption of power after a power failure results in the continuation of power to an electrical apparatus or suspension of power to said apparatus.

These and other objects and features of the present invention will become more fully apparent from the following description and appended claim taken in conjunction with the accompanying drawings wherein:

Figure 1:
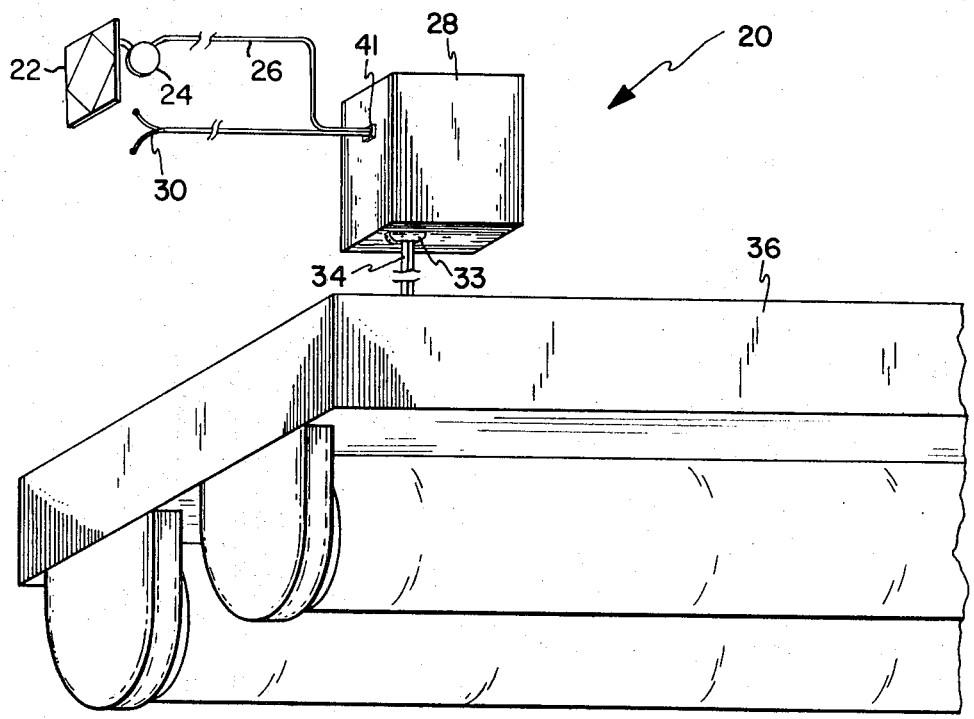
FIG. 1 is a schematic perspective of one presently preferred embodiment of the invention.

Referring now to the drawings, FIG. 1 illustrates a presently preferred embodiment of the system of the invention generally designated 20 wherein a touch plate 22 is connected through a capacitor 24 to the inner core 38 of a shielded control cable 26. The cable 26 may be of any satisfactory shielded type, for example, Beldon type 8450 shielded cable for audio and instruments. The touch plate 22 is solid which has no moving parts and may be fabricated of copper, stainless steel, or any suitable conducting material and may be formed into any desired shape to be aesthetically pleasing or complementary to the location of the switch. It is preferred, but not essential, that the capacitor 24 be located near the touch plate 22 to obviate the possibility of electric shock when the touch plate is activated. It has been found that the small capacitor 24 may be conveniently located immediately beneath the touch plate without requiring additional space in the mounting surface. An example of a suitable capacitor that may be used with the presently preferred embodiment of this invention is a 100 v. disc ceramic capacitor on the order of about .003 microfarad.

Figure 2:
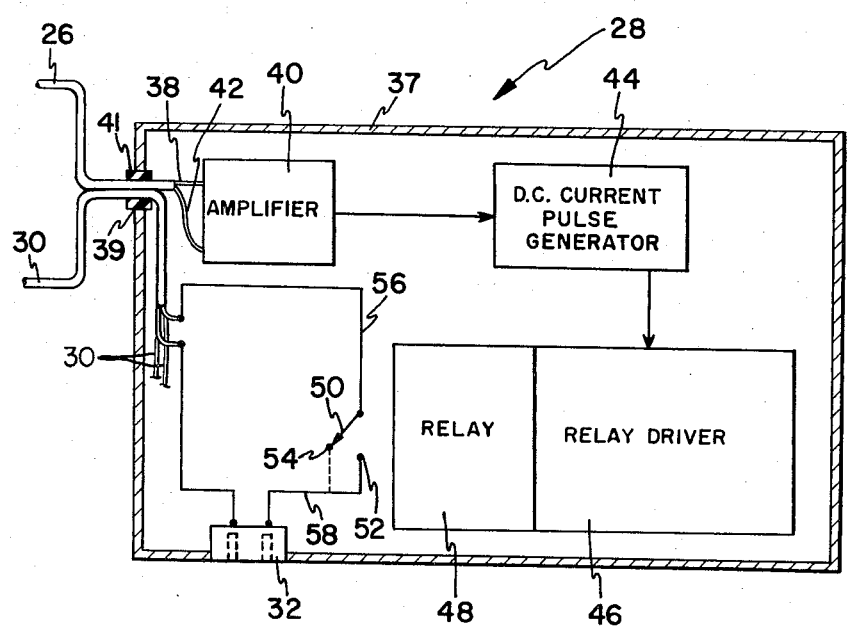
FIG. 2 is a block diagram of the control element of FIG. 1 specifically depicting representations of the major functional parts.
Figure 3:
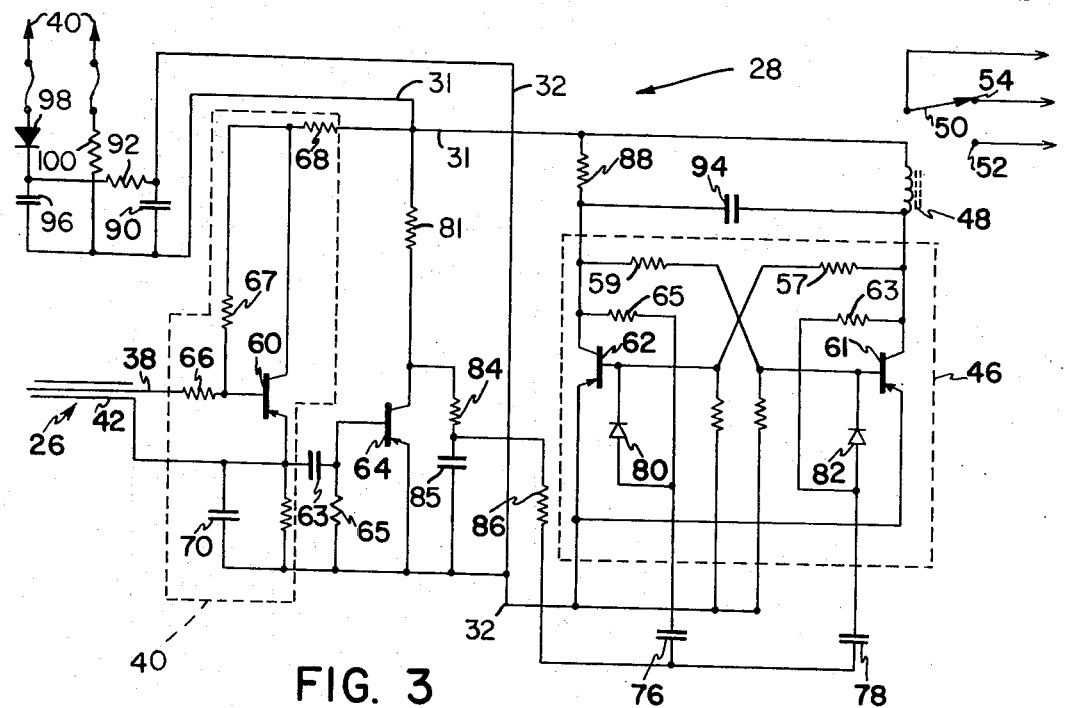
FIG. 3 is a representative circuit diagram of one presently preferred embodiment of the invention with the principal feedback circuitry included within the dotted section.

The shielded cable 26 leading from the touch plate 22 is connected into a control element 28 (best shown in FIG. 2). The control element 28 comprises the circuitry and relay which respond to the activation of the touch plate 22 to make electrical energy available to electrical devices in the system. Specifically, reference is made to FIG. 2 schematically depicting the control element 28 confined within a housing 37 fabricated of a suitable material such as metal. The shielded cable 26 enters the element housing 37 through a pre-formed aperture 39. A layer of insulating material 41 such as rubber or plastic prevents damage of the cable 26 by the housing 37. Another cable 30 is connected into a common alternating current (AC) source and likewise enters the control element 28 through the aperture 39 and insulating material 41 to provide electrical power for the system 20. The cable 30 is connected by circuit wiring 56 to an electrical relay switch 50, such that when the relay switch 50 impinges upon the point 52, a circuit is completed to the power outlet 32. An electrical device 36, such as an electrical light (FIG. 1), may be connected by suitable wiring 34 and plug 33 into the power outlet 32 and thereby placed in an "on" or "off" state with the relay switch 50. The position of relay switch 50 is determined by electrical signals from the touch plate 22 and transmitted along the inner core 38 of the shielded control cable 26. The cable 30, as shown in FIG. 3 is also connected to the other components of the control element so as to supply AC current to the touch plate 22 and core 38 of cable 26 and to supply DC current to the electronics hereinafter described. The inner core 38 of the shielded cable 26 receives full wave AC current since it is connected to the hot side 31 of line 30 through resistor 100, resistor 68, resistor 67 and resistor 66 and is not grounded through diode 98, but is grounded through a being who touches touchplate 22 connected to core 38. Thus when core 38 is grounded, a small AC current will flow in the core.

The control element 28 the inner core 38 of the shielded control cable 26 is directly connected into an amplifier 40 which amplifies the signal in the inner core 38 of the cable 26 and conducts the amplified signal along the outer shield 42 of the control cable 26 in the same stage or interval of development of the AC cycle in the cable core. The amplified signals is in phase with the input signal of amplifier 40 since the amplifier 40 is of the cathode follower type. Transferring the amplified signal to the cable shield 42 is termed "in-phase feedback" and it in effect eliminates normal electrical capacitance in the control cable 26 to preserve the sensitivity of the touch plate 22. If the core 38 is short, the signal in core 38 as first amplified by the amplifier 40 is strong enough to activate the remainder of the control element, but if the core 38 is long, the signal in core 38 as first amplified by amplifier 40 is not strong enough to activate the remainder of the control element. By feeding the amplified signal from core 38 to the shielding 42, the signal in shielding 42 will be impressed on core 38 due to their capacitance. The impressed signal, which is in phase with the original signal still being caused by grounding core 38, will combine with the original signal to produce a combined signal of greater strength which can be reamplified and feed back, if necessary, until the signal leaving amplifier 40 is of sufficient strength to activate the remainder of the control element.

The amplified impulse is also conducted from the amplifier 40 to a direct current pulse generator 44 which converts the alternating current signal received from the amplifier to direct current positive pulse which is conducted to a relay driver 46. Although a conventional relay such as the GM11D step relay manufactured by Potter and Brumfield could be used, it is presently preferred that the novel bistable relay driver 46 of this invention be used. The relay driver 46 hereinafter described uniquely provides a means of predetermining whether the relay switch 50 will consistently seek an open or closed circuit in the event power from the alternating current source 30 is suddenly denied and then restored to the system 20, such as in a power failure. The "failsafe" thus provided is particularly advantageous where electrical devices are periodically unattended. This advantage is uniquely accommodated by implementing a common relay 48 having a contact switch 50 in association with the relay driver 46. At a given voltage in the relay 48, the relay switch 50 contacts point 52. The switch 50 drops out to contact point 54 at a somewhat lower voltage. The presently preferred embodiment of this invention has a contact switch 50 which pulls in to contact point 52 at approximately 23 volts and drops out to contact point 54 at approximately 6 volts. The connective wire 58 to power outlet 32 is attached to contact point 52 providing for a complete circuit to the power outlet 32 when contact switch 50 is pulled in to impinge contact point 52. If it is so desired, connective wire 58 may be attached to contact point 54 instead of contact point 52 resulting in a complete circuit to the power outlet 32 when contact switch 50 is dropped out. Thus, when the power is resumed the electrical device 36 will be in a predetermined "on" or "off" state. Moreover, the novel bistable relay driver 46 requires very little electrical energy for operation.

Reference is now made to the circuit diagram of the control element 28 depicted in FIG. 3 which includes "in-phase feedback" and amplification circuitry 40.

Specifically, a signal that is caused in the control cable 26 by activating the touch plate 22 is passed through a resistor 66 which desensitizes the emitter-follower transistor 60 to high frequency interference signals incident upon the cable 26. The capacitor 70 and the transistors 67 and 68 likewise facilitate elimination of radio interference and the like in the cable 26. The signal received by the transistor 60 is amplified thereby and conducted through the cable shield 42 to maintain the sensitivity of the touch plate 22 as described above. The transistor 60 simultaneously conducts the amplified signal to the transistor 64 where it is further amplified. The capacitor 63 permits transfer of an AC signal from transistor 50 but prevents transfer of direct current to the transistor 64. When a signal is received at the base of the amplifier 64, a large direct current pulse appears at the capacitors 76 and 78 alternately directing the current to the bistable multivibrator 46 through the steering diodes 80 and 82. In detail when a signal is present at its base, transistor 64 becomes highly conductive. Hot line 31 supplies DC current through a pulse-charging resistor 81 to the collector of the transistor 64. The emitter of transistor 64 is connected to ground line 32. The base of transistor 64 is connected to one side of capacitor 63 so that the base of transistor 64 sees an alternating signal impressed upon capacitor 63. The operation of the pulse-generating circuit is as follows: normally, the signal received at the base of transistor 64 is insufficient to make transistor 64 become conductive. Thus, the entire DC potential at the hot line 31 is transmitted through resistors 81 and resistors 84 and is developed across capacitor 85. The DC potential is further sent through resistor 86 and is developed across capacitors 76 and 77. The lower plate of capacitor 85 is connected to the ground line 32 and the upper plate capacitor 85 is connected to the hot line 31 so that the full voltage potential is developed across capacitor 85. When a signal of sufficient magnitude is transmitted from transistor 60 across capacitor 63 to the base of transistor 64, transistor 64 becomes conductive, so that the potential voltage across capacitors 85, 76 and 78 suddenly collapses as the upper plate of capacitor 85 and the lower plate of capacitors 76 and 78 now become grounded, thus causing a sudden sharp pulse to be induced in the upper plates of capacitors 76 and 78. The sharp pulses induced in the upper plates of capacitors 76 and 78 are used to trigger the switching circuit to be hereinafter described. A resistor 84 protects the overloading of the amplifier 64 thereby preventing burn out. The resistor 86 functions to effectively minimize current surges which tend to cause inadvertent triggering of the relay switch 50.

The switching circuit comprises diodes 80 and 82, transistors 62 and 61, load resistor 88 and load coil 48, resistors 59 and 57, resistors 63 and 65. Transistors 62 and 61 become, upon receiving a signal at their base, conductive. Initially, we will assume that the transistor 61 is conducting and the transistor 62 is not conducting. DC current flows from line 31 through coil 48 through the transistor 61 to the line 32. Because transistor 61 is highly conductive, little or no current flows through resistor 63 and the voltage potential at the left-hand side of resistor 63 is low. Since transistor 62 is almost nonconductive, only a small quantity of current flows through load resistor 88 and then through resistors 59 to the base of transistor 61 thus keeping transistor 61 conductive. Since there is little current through load resistor 88 and resistors 65, almost the full DC voltage potential is available at the right-hand side of resistor 65 (FIG. 3). When transistor 64 becomes conductive, the positive charge on the lower plate of capacitors 76 and 78 is grounded. Since the left-hand side of resistor 63 (FIG. 3) is at the same voltage potential as the lower plate of capacitor 78, no charge is caused to flow through diode 82. However, since the right-hand side of resistor 65 is at higher voltage potential than the lower plate of capacitor 76, there is a positive pulse which flows from capacitor 76 through diode 80 up to the base of transistor 62. This pulse causes transistor 62 to become highly conductive, causing a flow of current through load resistor 88 and through transistor 62 to the ground line 32. When transistor 62 becomes highly conductive, no current flows through resistor 59 and thus the signal to the base of transistor 61 stops, and transistor 61 becomes non-conductive. The current through coil 48 ceases to flow in as large a magnitude. However, there is still a slight current flowing through coil 48 through resistor 57 to the base of transistor 62 to sustain transistor 62 in a conductive state. Now, because transistor 62 is highly conductive, the voltage potential at the right-hand side of resistor 65 is low and the voltage potential at the left-hand side of resistor 63 is high so that, now, the next pulse received will travel up through diode 82 and to the base of 61 and not through diode 80 to the base of 62 so that transistor 61 will then become conductive and transistor 62 will then become non-conductive, thus current flow is restored through the coil 48 and current flow is diminished through the load resistor 88. Thus, successive touches on the touch plate 22 (FIG. 1) results in alternate current paths through the diodes 80 and 82 and thereafter through the transistors 62 and 61 respectively.

In order to predetermine that relay 50 will remain impinged upon contact 54 when power is restored to the system after a power failure, resistor 88 is selected to be larger in value than the resistance in the relay coil 48. Therefore, when the first transistor 62 is conducting, the voltage at capacitor 90 is considerably more than when the second transistor 61 is conducting. For example, if we assume current to be flowing through the first transistor 62, a voltage on the order of about 30 volts on a capacitor 90 will rapidly accumulate. The contact switch 50 will remain in a "dropped out" position against contact point 54 because there is no current in the relay coil 48. Activation of the touch plate 22 permits the potential on the capacitor 90 to be directed through the second transistor 61 thereby stimulating the relay coil 48 with ample voltage, i.e. in this example 30 volts, to pull in the contact switch 50 against contact point 52. The relay coil 48 has enough internal resistance to maintain a voltage on the order of about 10 volts on the capacitor 90 thereby providing enough voltage to hold in the contact switch 50. A second touch of the touch plate 22 permits conductivity again through the first transistor 62 resulting in the immediate drop of potential in the relay coil 48 permitting the contact switch 50 to drop out against contact point 54 and the rapid reaccumulation of approximately 30 volts on the capacitor 90.

Power failures will cause the contact switch 50 to drop out against contact point 54 because neither transistor 61 nor 62 will be conducting current. Even though subsequent resumption of power may resume power communications through the transistor 61, the resistance in the circuit will develop, in the mentioned example, only about 10 volts which is not a voltage of great enough magnitude to the relay coil 48 to cause the contact switch 50 to pull in. The switch 50 will thus remain in its predetermined position even though power has been restored. The touch plate 22 must be activated to channel current through transistor 62 thereby accumulating the necessary voltage (30 volts) on capacitor 90 and then reactivated to pull in the contact switch 50 out of its predetermined position.

If contact point 52 is selected to complete the circuit to the power outlet 32 (FIG. 2), the electrical apparatus 36 (FIG. 1) will remain off when power is resumed after a power failure. Conversely, if contact point 54 is selected to complete the circuit, an electrical apparatus 36 will resume function when power is restored. Therefore, it may be predetermined whether an electrical apparatus will remain "off" or resume operation after power has been restored by simply connecting the desired contact point 52 or 54 into the circuit line 58 (FIG. 2).

With the exception of the touch plate 22 and the electrical device being controlled 36 all other electronics are supplied with DC power. Alternating current is converted to direct current by the conventional combination of a diode 98, capacitor 96 and resistor 100, which is connected through one side of the alternating current source 30. Resistor 92 acts as part of the voltage divider for the bistable circuit 46 and the capacitor 94 acts to suppress any remaining interference to prevent triggering the circuit prematurely.

Figure 4:
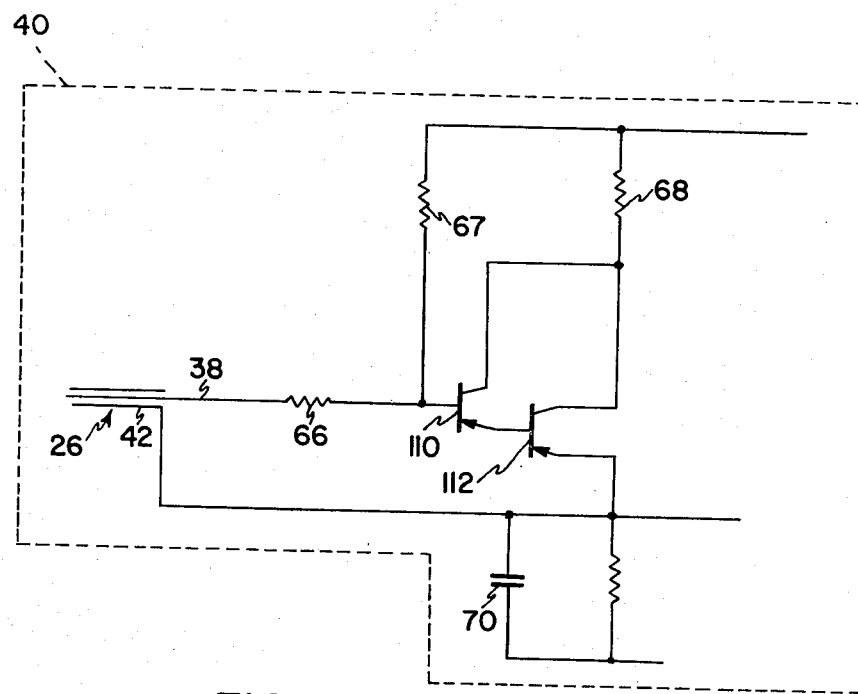
FIG. 4 depicts a circuit diagram of another presently preferred embodiment of the feedback circuitry which may be substituted for the circuitry in the dotted section of FIG. 3.

FIG. 4 schematically depicts alternate circuitry that may be used with the presently preferred embodiment of this invention to accommodate cables of extensive lengths without appreciably reducing the sensitivity of the touch plate. The circuitry 40 in FIG. 4 also provides in-phase feedback along the cable shield 42; however, the signal conducted along the shield 42 is under greater amplification. Two transistors 110 and 112, similar to the transistor 60 (FIG. 3), are connected together, thus forming a Darlington amplifier, which is conventional. Increased amplification resulting from the Darlington amplifier accommodates placement of touch plates 22 very remote from the control element 28 without loss of sensitivity due to cumulative capacitance in the cable 26. With the exception of the transistor arrangement, the in-phase feedback circuitry 40 of FIG. 4 may be essentially identical to the counterpart 40 of FIG. 3.

Operationally, the touch plate 22 is triggered by a capacitance to ground most conveniently achieved by touching the touch plate 22 with some part of the body. Activation of the touch plate is accomplished instantaneously since capacitance in the shielded control cable 26 leading from the touch plate 22 is substantially effectively eliminated by in-phase feedback along the outer shield 42 of the control cable 26. The resultant alternating current signal is then communicated to the control element 28 where it is amplified and converted to direct current in the direct current pulse generator 44. The direct current signal activates the bistable relay driver 46 to direct the relay switch 50 to an "on" or "off" position. Thus, an electrical device 36 connected into the control element 28 may be actuated by the touch plate 22.

Therefore, the presently preferred embodiment of this invention provides a unique touch plate system wherein a touch plate requiring no specially recessed mounting space may be substantially remote from the control element and simultaneously exhibit a positive operation without loss of sensitivity. Moreover, the present highly compact touch plate embodiment has been demonstrated to be substantially sparkless when used under electrostatic free conditions, and, therefore, completely safe for use in most potentially explosive environments. The presently preferred embodiment of this invention further provides a "failsafe" wherein it may be predetermined whether an electrical apparatus resumes operation or remains stopped after a power failure. In view of the foregoing, it is apparent that the presently preferred embodiments provide a safer, more dependable, commercially preferred touch plate system.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are therefore to be embraced therein.

What is claimed and desired to be secured by United States Letters Patent is:

1. A switching system comprising a source of AC power, an off-on inductively-operated switch controlling the availability of electrical energy at an outlet of the system, the switch being in electrical communication with the AC power source, a touch plate, amplifier circuitry, DC pulse generating circuitry and circuitry including a coil for inductively changing the position of the switch each time the touch plate is touched by a human being, the amplifier circuitry comprising means electrically-connecting the touch plate across a capacitor to the base of an amplifying transistor, means connecting the AC power source to the base of the amplifying transistor, feedback means conducting an amplified signal from the amplifying transistor to the touch plate and means conducting the amplified signal as AC across a capacitor to the DC pulse generating circuitry, the DC pulse generating circuitry comprising an amplifying transistor which is normally non-conductive but which becomes conductive when said amplified AC signal from the amplifier circuitry is of sufficient strength and communicated thereto by said conducting means of the amplifier circuitry, spaced capacitance means to which DC power is communicated and at which a potential is developed, the potential being suddenly discharged when the amplifying transistor of the pulse generating circuitry is conductive to send a pulse from the capacitance means to the controlling circuitry, the controlling circuitry comprising means connecting power thereto, means defining a first current flow path from the connecting means through the coil across the emitter and collector of a first transistor to ground, means defining a second current flow path from the connecting means across the emitter and collector of a second transistor to ground, means communicating successive ones of said pulses from the capacitance means of the pulse generating circuitry to the base of the first transistor and to the base of the second transistor, respectively, and means for communicating electrical power from the conductive one of the two transistors during the time interval between said pulses whereby when current flows through the first path, the switch will be inductively biased to one position, and when the current flows through the second path, the switch will be in the other position.

References Cited

UNITED STATES PATENTS

| | | | |
|---|---|---|---|
| 2,782,308 | 2/1957 | Rug | 200—52 |
| 2,802,178 | 8/1957 | Shafer et al. | 340—208 X |
| 3,109,893 | 11/1963 | Burns | 200—52 |
| 3,111,608 | 11/1963 | Boenning et al. | 317—146 |
| 3,194,975 | 7/1965 | Diamond | 200—52 |
| 3,255,380 | 6/1966 | Atkins et al. | 200—52 |
| 3,384,789 | 5/1968 | Teshima | 331—65 X |

DAVID SMITH, JR., Primary Examiner

U.S. Cl. X.R.

317—148.5; 307—1; 331—65, 113; 340—258, 200